(12) United States Patent
Mankame et al.

(10) Patent No.: US 10,476,348 B2
(45) Date of Patent: Nov. 12, 2019

(54) ELECTRIC MOTOR HAVING ASYMMETRIC CONFIGURATION FOR GENERATING UNBALANCED FORCE

(71) Applicant: GM GLOBAL TECHNOLOGY OPERATIONS LLC, Detroit, MI (US)

(72) Inventors: Nilesh D. Mankame, Ann Arbor, MI (US); Alireza Fatemi, Rochester Hills, MI (US); Avoki M. Omekanda, Rochester, MI (US); Thomas W. Nehl, Shelby Township, MI (US); Lei Hao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 102 days.

(21) Appl. No.: 15/845,353

(22) Filed: Dec. 18, 2017

(65) Prior Publication Data

US 2019/0190347 A1    Jun. 20, 2019

(51) Int. Cl.
*H02K 1/17* (2006.01)
*H02K 7/06* (2006.01)
*H02K 1/27* (2006.01)
*H02K 1/26* (2006.01)

(52) U.S. Cl.
CPC .............. *H02K 7/061* (2013.01); *H02K 1/17* (2013.01); *H02K 1/26* (2013.01); *H02K 1/276* (2013.01)

(58) Field of Classification Search
CPC ........... H02K 7/063; H02K 7/061; B06B 1/16
See application file for complete search history.

(56) References Cited

U.S. PATENT DOCUMENTS

| | | | | |
|---|---|---|---|---|
| 3,732,561 A | * | 5/1973 | McGinnis | G09F 11/23 340/815.64 |
| 5,578,878 A | * | 11/1996 | Hall | B60T 8/4022 310/193 |
| 5,604,389 A | * | 2/1997 | Nitta | H02K 1/146 310/209 |
| 5,705,871 A | * | 1/1998 | Suzuki | G01D 5/2033 310/156.44 |
| 2001/0013730 A1 | * | 8/2001 | Yamaguchi | H02K 7/063 310/81 |
| 2002/0195891 A1 | * | 12/2002 | Miyasaka | H02K 7/063 310/81 |
| 2018/0166949 A1 | * | 6/2018 | Hu | H02K 7/063 |

* cited by examiner

*Primary Examiner* — Dang D Le
(74) *Attorney, Agent, or Firm* — Quinn IP Law

(57) ABSTRACT

An electric motor includes a rotor having a stack of laminations positioned axially relative to one another. The stack of laminations includes a first rotor lamination that is divided into a first portion and a second portion. The first rotor lamination is configured to have an asymmetric mass distribution such that the first portion has a first mass and the second portion has a second mass, with the first mass being different from the second mass. The electric motor is configured to selectively generate an unbalanced force during operation (i.e., when the rotor is spinning). The electric motor may include a stator configured to have an asymmetric magnetic field distribution. The electric motor may be employed in a haptic assembly and eliminates the need for a separate eccentric mass to generate a haptic signal.

20 Claims, 3 Drawing Sheets

ELECTRIC MOTOR HAVING ASYMMETRIC CONFIGURATION FOR GENERATING UNBALANCED FORCE

INTRODUCTION

The disclosure relates to an electric motor having an asymmetric configuration for generating an unbalanced force. The unbalanced force results in a mechanical vibration which may be employed in a number of devices, such as a haptic device. Haptic devices generate a signal intended to be felt by a user as an alert or feedback mechanism. The signal required for the haptic alert may be produced by an unbalanced eccentric mass, which is attached to a shaft of an electric motor. However, the eccentric mass adds to the length and mass of the haptic device.

SUMMARY

Disclosed herein is an electric motor with a rotor having a stack of laminations positioned axially relative to one another. The stack of laminations includes a first rotor lamination that is divided into a first portion and a second portion. The first rotor lamination is configured to have an asymmetric mass distribution such that the first portion has a first mass and the second portion has a second mass. The first mass is different from the second mass. The first rotor lamination is configured to selectively generate an unbalanced force. In other words, the electric motor is configured to generate an unbalanced force during operation (i.e., when the rotor is spinning). Also disclosed is a haptic assembly employing the electric motor to generate a haptic signal.

The asymmetric mass distribution may be generated by one or more of the features described below. The first rotor lamination includes a central hub and a plurality of teeth extending radially outwards from the central hub. In one example, the first portion is characterized by at least one cutout in the central hub. At least one of the plurality of teeth in the first portion may be characterized by a perforation. In another example, at least one of the plurality of teeth in the first portion defines a first radial length and another of the plurality of teeth in the second portion defines a second radial length, with the first radial length being different from the second radial length. In another example, at least one of the plurality of teeth in the first portion defines a first thickness and another of the plurality of teeth in the second portion defines a second thickness, with the first thickness being different from the second thickness.

The first rotor lamination may include a respective plurality of tooth tips extending in a circumferential direction from the plurality of teeth. The respective plurality of tooth tips defines respective outer end surfaces and respective inner end surfaces. In one example, at least one of the respective plurality of tooth tips in the first portion is characterized by a hole. At least one of the respective plurality of tooth tips in the first portion may include an outer notch on the respective outer end surface. In another example, at least one of the respective plurality of tooth tips in the first portion includes an inner notch on the respective inner end surface.

In another example, at least one of the plurality of tooth tips in the first portion defines a first circumferential width and another of the plurality of tooth tips in the second portion defines a second circumferential width, with the first circumferential width being different from the second circumferential width. The respective plurality of tooth tips may include a first pair of adjacent tooth tips in the first portion and a second pair of adjacent tooth tips in the second portion. The first pair of adjacent tooth tips defines a first air gap between respective adjacent tips. The second pair of adjacent tooth tips defines a second air gap between respective adjacent tips, with the first air gap being different from the second air gap.

In another example, the first rotor lamination has a first total mass. The stack of laminations includes a second rotor lamination having a second total mass. The stack of laminations may be characterized by an axially asymmetric mass distribution such that the first total mass is different from the second total mass. The electric motor includes a plurality of slots corresponding to and interspaced between the plurality of teeth. Respective conductors are configured to allow a current to flow from one of the plurality of slots to another of the plurality of slots. In one example, the first portion has a first number of respective conductors and the second portion has a second number of respective conductors, with the first number being different from the second number.

The electric motor includes a stator having a plurality of magnets, the stator being divided into a number of pole pairs each falling into one of a first section and a second section. The stator may be configured to have an asymmetric magnetic field distribution such that the first section is characterized by a first magnetic field intensity and the second section is characterized by a second magnetic field intensity, the first magnetic field intensity being different from the second magnetic field intensity. In one example, the first section includes a first magnet having a first strength and a first volume and the second section includes a second magnet having a second strength and a second volume. The asymmetric magnetic field distribution is achieved by the first and second strengths being different and the first and second volumes being the same. In another example, asymmetric magnetic field distribution is achieved by each of the plurality of magnets having the same strength, while a respective total volume of the plurality of magnets in the first section is different from the second section, i.e., the total volume of the plurality of magnets in the first section is different from the total volume of the plurality of magnets in the second section.

The above features and advantages and other features and advantages of the present disclosure are readily apparent from the following detailed description of the best modes for carrying out the disclosure when taken in connection with the accompanying drawings.

DETAILED DESCRIPTION

Figure 1:
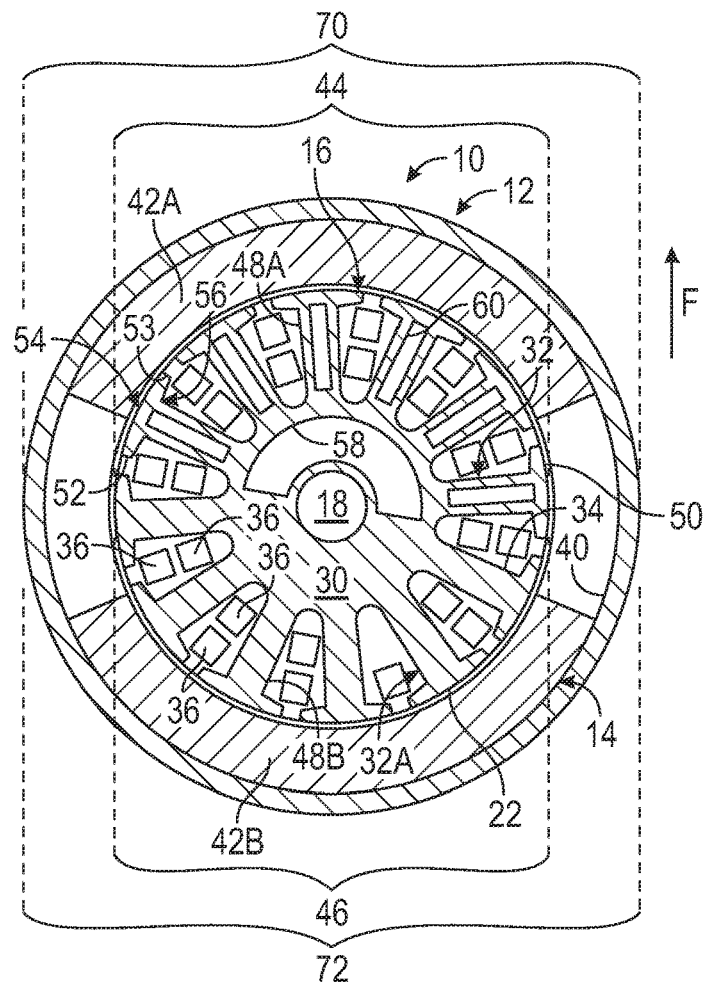
FIG. 1 is a schematic sectional view of an electric motor having a plurality of rotor laminations and a stator.

Referring to the FIGURES, wherein like reference numbers refer to the same or similar components throughout the several views, FIG. 1 is a schematic sectional view of an electric motor 10. The electric motor 10 is configured to generate an electric machine torque by, for example, converting electrical energy into rotational motion. The electric motor 10 may be configured to receive electrical energy from a power source, such as a battery array (not shown), to generate rotational motion. The electric motor 10 may include but is not limited to, permanent magnet direct current, an interior permanent magnet, a surface permanent magnet, an induction, synchronous, reluctance or a separately-excited/wound-field motor. As described below, the electric motor 10 may be a part of a haptic assembly 12 and configured to produce a haptic signal via generation of an unbalanced force F.

Figure 2:
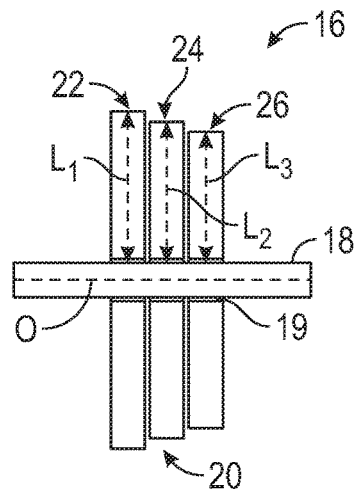
FIG. 2 is a schematic fragmentary side view of the plurality of rotor laminations of the electric motor of FIG. 1, with the stator removed.

Referring to FIG. 1, the electric motor 10 includes a stator 14 and a rotor 16 that is rotatable relative to and within the stator 14. The rotor 16 may be annularly-shaped with a central shaft 18 (see FIGS. 1 and 2) extending through a central opening 19 (see FIG. 2). Referring to FIG. 2, the rotor 16 may include a stack of laminations 20 positioned axially relative to one another. The stack of laminations 20 includes a first rotor lamination 22, a second rotor lamination 24 and a third rotor lamination 26, as shown in FIG. 2. It is to be understood that the number of laminations in the stack of laminations 20 may be varied based on the application at hand. The first rotor lamination 22 is illustrated in FIG. 1. Alternatively, the rotor 16 and/or stator 14 may be made from a solid ferrous material.

Referring to FIG. 1, the first rotor lamination 22 includes a central hub 30 with a plurality of teeth 32 extending radially outwards from the central hub 30. The plurality of teeth 32 are interspaced between a corresponding plurality of slots 34. Referring to FIG. 1, the electric motor 10 includes multiple conductors 36 configured to allow a current to flow from a respective first leg of one of the plurality of slots 34 to a respective second leg in another of the plurality of slots 34. The conductors 36 may define a substantially rectangular cross-section. It is understood that the conductors 36 shown in FIG. 1 are schematic, and are not meant to represent the scale or specific shape of the conductors 36 as understood by those skilled in the art. It is understood that the electric motor 10 may include whatever number of slots, poles and phases suitable to the application at hand.

Referring to FIG. 1, the stator 14 may include one or more stator slots 40 having a portion or the entirety filled with one or more permanent magnets, such as first magnet 42A and second magnet 42B, for generating a magnetic field. The stator slots 40 may extend lengthwise along the axis O (shown in FIG. 2) and may be spaced from each other circumferentially.

Referring to FIG. 1, in an example configuration with two magnetic poles, the first rotor lamination 22 is divided into a first portion 44 and a second portion 46. The first rotor lamination 22 is configured to have an asymmetric mass distribution such that the first portion 44 has a first mass and the second portion 46 has a second mass, with the first mass being different from the second mass. In one example, the first portion 44 and the second portion 46 each cover approximately 50% of the total volume of the first rotor lamination 22. In another example, the first portion 44 ranges between about 40% to 60% and the second portion 46 covers the remaining 60% to 40% of the total volume of the first rotor lamination 22. The asymmetric mass distribution may be achieved by one or more of the features described below and results in the generation of an unbalanced force F when the rotor 16 is spinning. In other words, the first rotor lamination 22 is configured to selectively generate the unbalanced force F when the electric motor 10 is in operation. The unbalanced force is a result of unbalanced mass and/or unbalanced magnetic circuit. The unbalanced force F causes a vibration or other tactile signal, referred to herein as the haptic signal, that is discernable by a user (not shown) of a haptic assembly 12. The electric motor 10 may be a component of the haptic assembly 12. The electric motor 10 eliminates the need for a separate eccentric mass to generate the haptic signal. As a result, the electric motor 10 reduces packaging size, allowing both a shorter dimension and reduced mass for the haptic assembly 12. The electric motor 10 reduces cost, part count and cross-talk, allowing relatively closer spacing of multiple haptic units.

Referring to FIG. 1, the first rotor lamination 22 may include a respective plurality of tooth tips 50 extending in a circumferential direction (between respective tip ends 52, 53) from the plurality of teeth 32. The respective plurality of tooth tips 50 defines respective outer end surfaces 54 and respective inner end surfaces 56. Referring to FIG. 1, in one example, the first portion 44 is characterized by a cutout 58 in the central hub 30. This results in a lower mass for the first portion 44, relative to the second portion 46. In the example shown, the cutout 58 is shaped as a half ring.

Referring to FIG. 1, the plurality of teeth 32 includes a first tooth 48A in the first portion 44 and a second tooth 48B in the second portion 46. Referring to FIG. 1, at least one of the plurality of teeth 32 in the first portion 44 (such as the first tooth 48A) may be characterized by a perforation 60. In the example shown in FIG. 1, each of the plurality of teeth 32 in the first portion 44 (six teeth in FIG. 1) has a respective perforation 60. It is to be understood that the number of the plurality of teeth 32 having a perforation 60, as well as the respective sizes of the perforation 60, may be varied according to the application at hand.

Referring to FIG. 1, the unbalanced force F may be introduced by having an asymmetric distribution of conductors 36, for example, by removing some of the conductors 36 in the first portion 44 (see slot 32A in FIG. 1 with fewer conductors 36). In one example, the first portion 44 has a first number of conductors 36 and the second portion 46 has a second number of conductors 36, with the first number being different from the second number. Additionally, the unbalanced force may be introduced by creating an asymmetric distribution of current in the first portion 44 relative to the second portion 46, for example, by selectively removing the excitation from some of the conductors 36.

Figure 3:
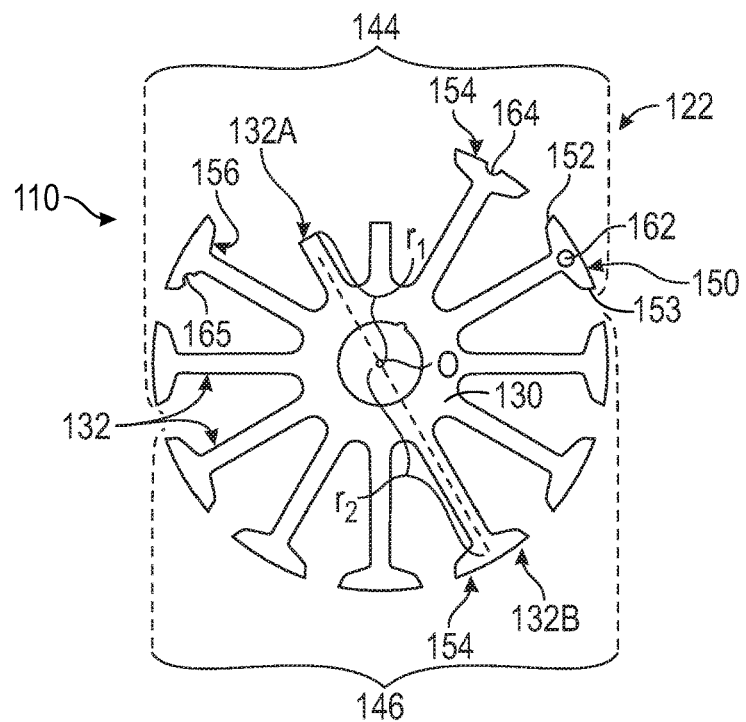
FIG. 3 is a schematic fragmentary sectional view of an example rotor lamination that may be employed in the electric motor of FIG. 1.

Referring to FIG. 3, a schematic fragmentary view of an example rotor lamination of an electric motor 110 is shown, in accordance with another embodiment of the disclosure. It is to be understood that the various elements shown in FIGS. 1-5 may be employed singly or combined in various ways. The electric motor 110 includes a first rotor lamination 122 divided into a first portion 144 and a second portion 146. The first rotor lamination 122 is configured to have an asymmetric mass distribution such that the first portion 144 has a first mass and the second portion 146 has a second mass, with the first mass being different from the second mass.

The first rotor lamination 22 is configured to generate an unbalanced force when the electric motor 110 is in operation. The first rotor lamination 122 includes a plurality of teeth 132 extending from a central hub 130. The plurality of teeth 132 includes a first tooth 132A in the first portion 144 and a second tooth 132B in the second portion 146. Referring to FIG. 3, the asymmetric mass distribution may be achieved by varying the radial lengths of the plurality of teeth 132. The first tooth 132A may be characterized by a first radial length (shown as $r_1$ in FIG. 3). The second tooth 132B may be characterized by a second radial length (shown as $r_2$ in FIG. 3), with the first radial length ($r_1$) being different from the second radial length ($r_2$). Here the first radial length ($r_1$) is smaller than the second radial length ($r_2$), in order for the first portion 144 to have a smaller mass than the second portion 146.

Referring to FIG. 3, the first rotor lamination 122 includes a respective plurality of tooth tips 150 extending in a circumferential direction (between respective tip ends 152, 153) from the plurality of teeth 132. The respective plurality of tooth tips 150 defines respective outer end surfaces 154 and respective inner end surfaces 156. As shown in FIG. 3, at least one of the respective plurality of tooth tips 150 in the first portion 144 may be characterized by a hole 162. As shown in FIG. 3, at least one of the respective plurality of tooth tips 150 in the first portion 144 may include an outer notch 164 on the respective outer end surface 154. As shown in FIG. 3, at least one of the respective plurality of tooth tips 150 in the first portion 144 includes an inner notch 165 on the respective inner end surface 156. The hole 162, the outer notch 164 and the inner notch 165 reduces the mass of the first portion 144 relative to the second portion. The number of the plurality of teeth 132 having a hole 162, an outer notch 164 and an inner notch 165 as well as their respective sizes may be varied according to the application at hand.

Figure 4:
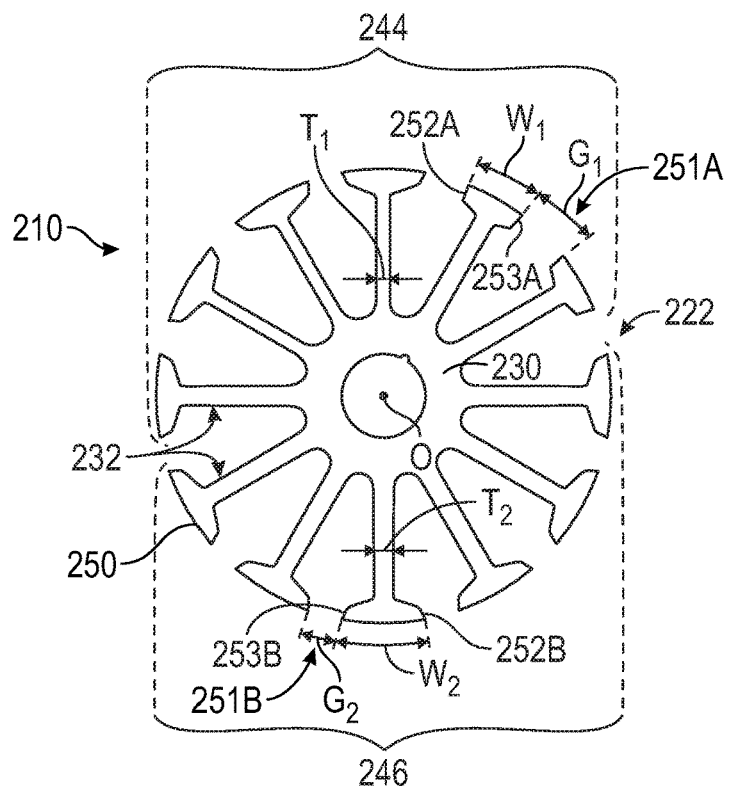
FIG. 4 is a schematic fragmentary sectional view of another example rotor lamination that may be employed in the electric motor of FIG. 1.

Referring to FIG. 4, a schematic fragmentary view of an example rotor lamination of an electric motor 210 is shown, in accordance with yet another embodiment of the disclosure. The electric motor 210 includes a first rotor lamination 222 divided into a first portion 244 and a second portion 246. The first rotor lamination 222 is configured to have an asymmetric mass distribution such that the first portion 244 has a first mass and the second portion 246 has a second mass, with the first mass being different from the second mass.

Referring to FIG. 4, the first rotor lamination 222 includes a plurality of teeth 232 extending radially outwards from a central hub 230. As shown in FIG. 4, at least one of the plurality of teeth 232 in the first portion 244 defines a first thickness ($T_1$) and another of the plurality of teeth 232 in the second portion 246 defines a second thickness ($T_2$), with the first thickness ($T_1$) being different from the second thickness ($T_2$). Stated differently, one or more of the plurality of teeth 132 in the first portion 244 may be configured as "skinny teeth" in order to achieve an asymmetric mass distribution. In the example shown in FIG. 4, three (having a first thickness ($T_1$)) out of six of the plurality of teeth 232 in the first portion 244 are "skinny teeth." This number may be varied based on the application.

Referring to FIG. 4, the first rotor lamination 222 may include a respective plurality of tooth tips 250 extending circumferentially from the plurality of teeth 232. As shown in FIG. 4, the respective plurality of tooth tips 250 includes a first pair of adjacent tooth tips 251A in the first portion 244 and a second pair of adjacent tooth tips 251B in the second portion 246. The first pair of adjacent tooth tips 251A defines a first air gap ($G_1$ in FIG. 4) between respective adjacent tips. The second pair of adjacent tooth tips 251B defines a second air gap ($G_2$ in FIG. 4) between respective adjacent tips. As shown in FIG. 4, the first air gap ($G_1$) is configured to be different from the second air gap ($G_1$) in order to achieve an asymmetric mass distribution.

As shown in FIG. 4, at least one of the plurality of tooth tips 250 in the first portion 244 may define a first circumferential width ($W_1$) between respective tip ends 252A, 253A, while another of the plurality of tooth tips 250 in the second portion 246 defines a second circumferential width ($W_2$) between its respective tip ends 252B, 253B. As shown in FIG. 4, the first circumferential width ($W_1$) may be configured to be different from the second circumferential width ($W_2$) in order to achieve an asymmetric mass distribution.

Referring to FIG. 2, the stack of laminations 20 may be characterized by an axially asymmetric mass distribution such that a first total mass of the first rotor lamination 22 is different from a second total mass of the second rotor lamination 24 (shown in FIG. 2). For example, the first rotor lamination 22, the second rotor lamination 24 and the third rotor lamination 26 may define different lengths $L_1$, $L_2$, $L_3$, respectively (see in FIG. 2) from the central shaft 18, in order to generate an axially asymmetric mass distribution.

Alternatively, referring to FIG. 1, the stator 14 may be divided into a first section 70 and a second section 72 and configured to have an asymmetric magnetic field distribution such that the first section 70 is characterized by a first magnetic field intensity and the second section 72 is characterized by a second magnetic field intensity that is different from the first magnetic field intensity. Example configurations for achieving the asymmetric magnetic field distribution are shown in FIGS. 1 and 5.

In FIG. 1, the first section 70 includes a first magnet 42A having a first strength and a first volume. The second section 72 includes a second magnet 42B having a second strength and a second volume, with the first and second strengths being different and the first and second volumes being the same. Thus, the total volume of magnets in the first section 70 is the same as the total volume of magnets in the second section 72, but the first section 70 includes magnets of dissimilar strengths relative to the second section 72.

Figure 5:
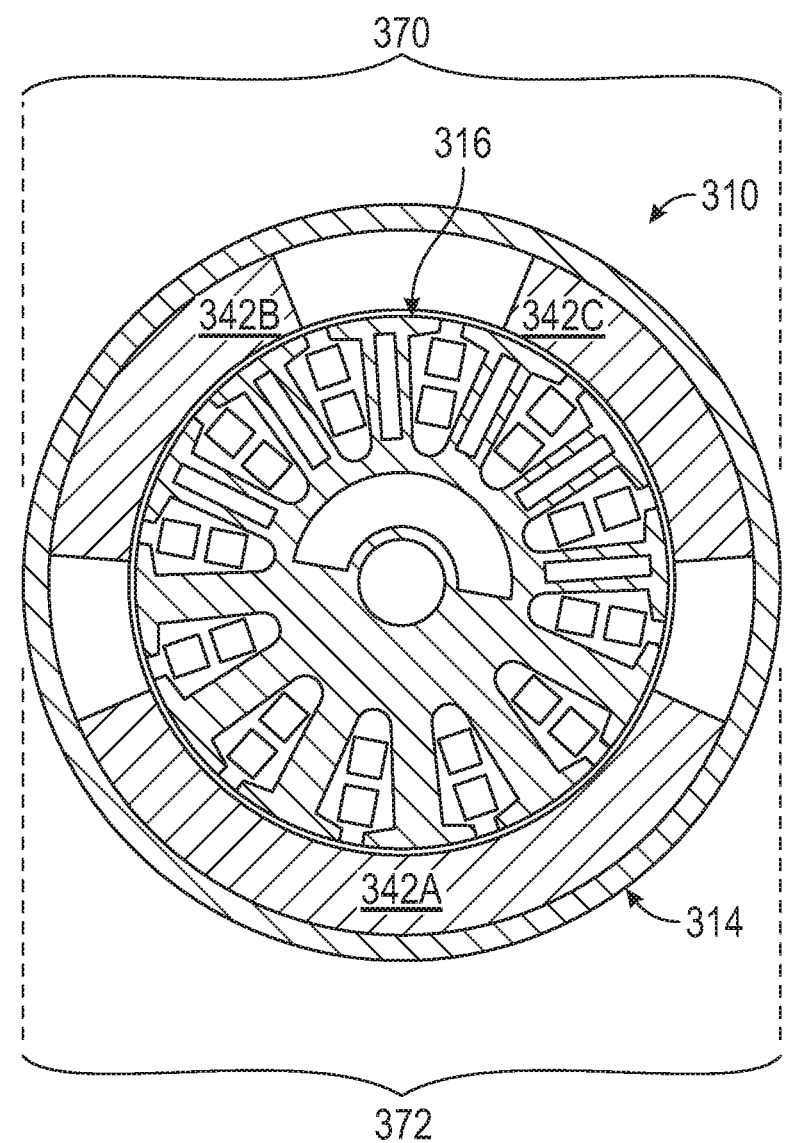
FIG. 5 is a schematic sectional view of an electric motor, in accordance with another embodiment of the disclosure.

Referring to FIG. 5, the electric motor 310 includes a stator 314 and a rotor 316. The configuration of the rotor 316 is similar to the rotor 16, shown in FIG. 1. The stator 314 may be divided into a first section 370 and a second section 372. The stator 314 is configured to have an asymmetric magnetic field distribution such that the first section 370 is characterized by a first magnetic field intensity and the second section 372 is characterized by a second magnetic field intensity, with the first magnetic field intensity being different from the second magnetic field intensity. Referring to FIG. 5, the first section 370 includes a first magnet 342A and a second magnet 342B, while the second section includes a single third magnet 342C. Each of the first magnet 342A, second magnet 342B and third magnet 342C has the same strength. Here, asymmetric magnetic field distribution is achieved because a total volume of the plurality of magnets in the first section 370 is different from a total volume of the plurality of magnets in the second section 372, while each of the first magnet 342A, second magnet 342B and third magnet 342C has the same strength.

The exact dimensions of the various components may be selected as required for each particular application. The values may be derived through an optimization process performed using finite element analysis simulation tools or other modeling methods employed in the art. For example, the teeth lengths, teeth widths and air gaps may be selected based on the configuration that produces a suitable vibration.

The detailed description and the drawings or FIGURES are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. An electric motor comprising:
a rotor having a stack of laminations positioned axially relative to one another;
a stator having a plurality of magnets, the stator being divided into a first section and a second section;
wherein the stator is configured to have an asymmetric magnetic field distribution such that the first section is characterized by a first magnetic field intensity and the second section is characterized by a second magnetic field intensity, the first magnetic field intensity being different from the second magnetic field intensity;
wherein the first section includes a first magnet having a first strength and a first volume;
wherein the second section includes a second magnet having a second strength and a second volume, the first and second strengths being different and the first and second volumes being the same;
wherein the stack of laminations includes a first rotor lamination divided into a first portion and a second portion;
wherein the first rotor lamination includes a central hub and a plurality of teeth extending radially outwards from the central hub;
wherein the first rotor lamination is configured to have an asymmetric mass distribution such that the first portion has a first mass and the second portion has a second mass, the first mass being different from the second mass; and
wherein the first rotor lamination is configured to selectively generate an unbalanced force.

2. The electric motor of claim 1, wherein:
the first portion is characterized by at least one cutout in the central hub; and
at least one of the plurality of teeth in the first portion is characterized by a perforation.

3. The electric motor of claim 1, further comprising:
a plurality of slots interspaced between and corresponding to the plurality of teeth;
respective conductors configured to allow a current to flow from one of the plurality of slots to another of the plurality of slots;
wherein the first portion has a first number of respective conductors and the second portion has a second number of respective conductors, the first number being different from the second number.

4. The electric motor of claim 1, wherein:
at least one of the plurality of teeth in the first portion defines a first radial length; and
at least another of the plurality of teeth in the second portion defines a second radial length, the first radial length being different from the second radial length.

5. The electric motor of claim 1, wherein:
at least one of the plurality of teeth in the first portion defines a first thickness; and
at least another of the plurality of teeth in the second portion defines a second thickness, the first thickness being different from the second thickness.

6. The electric motor of claim 1, wherein:
the first rotor lamination includes a respective plurality of tooth tips extending in a circumferential direction from the plurality of teeth; and
at least one of the respective plurality of tooth tips in the first portion is characterized by a hole.

7. The electric motor of claim 1, wherein:
the first rotor lamination includes a respective plurality of tooth tips extending in a circumferential direction from the plurality of teeth;
the respective plurality of tooth tips define respective outer end surfaces and respective inner end surfaces; and
at least one of the respective plurality of tooth tips in the first portion includes at least one of an outer notch on the respective outer end surface and an inner notch on the respective inner end surface.

8. The electric motor of claim 1, wherein:
the first rotor lamination includes a respective plurality of tooth tips extending in a circumferential direction from the plurality of teeth;
at least one of the respective plurality of tooth tips in the first portion defines a first circumferential width; and
at least another of the respective plurality of tooth tips in the second portion defines a second circumferential width, the first circumferential width being different from the second circumferential width.

9. The electric motor of claim 1, wherein:
the respective plurality of tooth tips includes a first pair of adjacent tooth tips in the first portion and a second pair of adjacent tooth tips in the second portion;
the first pair of adjacent tooth tips defines a first air gap between respective adjacent tips; and
the second pair of adjacent tooth tips define a second air gap between respective adjacent tips, the first air gap being different from the second air gap.

10. The electric motor of claim 1, wherein:
the first rotor lamination has a first total mass;
the stack of laminations includes a second rotor lamination having a second total mass; and
the stack of laminations is characterized by an axially asymmetric mass distribution such that the first total mass is different from the second total mass.

11. The electric motor of claim 1, further comprising:
a stator having a plurality of magnets, the stator being divided into a first section and a second section;
wherein the stator is configured to have an asymmetric magnetic field distribution such that the first section is characterized by a first magnetic field intensity and the second section is characterized by a second magnetic field intensity, the first magnetic field intensity being different from the second magnetic field intensity;
wherein each of the plurality of magnets has a same strength; and
wherein a respective total volume of the plurality of magnets in the first section is different from the second section.

12. A haptic assembly configured to deliver a haptic signal, the haptic assembly comprising:
an electric motor having a rotor with a stack of laminations positioned axially relative to one another;
a stator having a plurality of magnets, the stator being divided into a first section and a second section;

wherein the stator is configured to have an asymmetric magnetic field distribution such that the first section is characterized by a first magnetic field intensity and the second section is characterized by a second magnetic field intensity, the first magnetic field intensity being different from the second magnetic field intensity;

wherein each of the plurality of magnets has a same strength;

wherein a respective total volume of the plurality of magnets in the first section is different from the second section;

wherein the stack of laminations includes a first rotor lamination divided into a first portion and a second portion;

wherein the first rotor lamination includes a central hub and a plurality of teeth extending radially outwards from the central hub;

wherein the first rotor lamination is configured to have an asymmetric mass distribution such that the first portion has a first mass and the second portion has a second mass, the first mass being different from the second mass; and wherein the electric motor is configured to selectively generate an unbalanced force.

13. The haptic assembly of claim 12, wherein:
the first portion is characterized by at least one cutout in the central hub;
at least one of the plurality of teeth in the first portion defines a first radial length; and
at least another of the plurality of teeth in the second portion defines a second radial length, the first radial length being different from the second radial length.

14. The haptic assembly of claim 12, wherein:
at least one of the plurality of teeth in the first portion defines a first thickness; and
at least another of the plurality of teeth in the second portion defines a second thickness, the first thickness being different from the second thickness.

15. The haptic assembly of claim 12, wherein:
the first rotor lamination includes a respective plurality of tooth tips extending in a circumferential direction from the plurality of teeth;
the respective plurality of tooth tips define respective outer end surfaces and respective inner end surfaces; and
at least one of the respective plurality of tooth tips in the first portion includes at least one of an inner notch on the respective inner end surface and an outer notch on the respective outer end surface.

16. The haptic assembly of claim 12, wherein:
at least one of the plurality of teeth in the first portion is characterized by a perforation;
the first rotor lamination includes a respective plurality of tooth tips extending in a circumferential direction from the plurality of teeth; and
at least one of the respective plurality of tooth tips in the first portion is characterized by a hole.

17. The haptic assembly of claim 12, wherein:
the first rotor lamination includes a respective plurality of tooth tips extending in a circumferential direction from the plurality of teeth;
at least one of the respective plurality of tooth tips in the first portion defines a first circumferential width; and
at least another of the respective plurality of tooth tips in the second portion defines a second circumferential width, the first circumferential width being different from the second circumferential width.

18. The haptic assembly of claim 12, wherein:
the first rotor lamination includes a respective plurality of tooth tips extending in a circumferential direction from the plurality of teeth;
the respective plurality of tooth tips includes a first pair of adjacent tooth tips in the first portion and a second pair of adjacent tooth tips in the second portion;
the first pair of adjacent tooth tips defines a first air gap between respective adjacent tips; and
the second pair of adjacent tooth tips define a second air gap between respective adjacent tips, the first air gap being different from the second air gap.

19. The haptic assembly of claim 12, further comprising:
wherein the stator is configured to have an asymmetric magnetic field distribution such that the first section is characterized by a first magnetic field intensity and the second section is characterized by a second magnetic field intensity, the first magnetic field intensity being different from the second magnetic field intensity;
wherein the first portion is characterized by at least one cutout in the central hub;
wherein at least one of the plurality of teeth in the first portion defines a first radial length and at least another of the plurality of teeth in the second portion defines a second radial length, the first radial length being different from the second radial length;
wherein at least one of the plurality of teeth in the first portion defines a first thickness and at least another of the plurality of teeth in the second portion defines a second thickness, the first thickness being different from the second thickness;
wherein the first rotor lamination includes a respective plurality of tooth tips extending in a circumferential direction from the plurality of teeth;
wherein the respective plurality of tooth tips define respective outer end surfaces and respective inner end surfaces such that at least one of the respective plurality of tooth tips in the first portion includes at least one of an inner notch on the respective inner end surface and an outer notch on the respective outer end surface;
wherein at least one of the plurality of teeth in the first portion is characterized by a perforation; and
wherein at least one of the respective plurality of tooth tips in the first portion defines a first circumferential width and at least another of the respective plurality of tooth tips in the second portion defines a second circumferential width, the first circumferential width being different from the second circumferential width.

20. An electric motor comprising:
a rotor having a stack of laminations positioned axially relative to one another;
a stator having a plurality of magnets, the stator being divided into a first section and a second section;
wherein the stator is configured to have an asymmetric magnetic field distribution such that the first section is characterized by a first magnetic field intensity and the second section is characterized by a second magnetic field intensity, the first magnetic field intensity being different from the second magnetic field intensity;
wherein each of the plurality of magnets has a same strength;
wherein a respective total volume of the plurality of magnets in the first section is different from the second section;
wherein the stack of laminations includes a first rotor lamination divided into a first portion and a second portion;

wherein the first rotor lamination includes a central hub and a plurality of teeth extending radially outwards from the central hub;

wherein the first rotor lamination is configured to have an asymmetric mass distribution such that the first portion has a first mass and the second portion has a second mass, the first mass being different from the second mass; and wherein the first rotor lamination is configured to selectively generate an unbalanced force.

* * * * *